(12) United States Patent
Schmitz et al.

(10) Patent No.: US 11,638,330 B2
(45) Date of Patent: Apr. 25, 2023

(54) FOOD PREPARATION APPARATUS WITH ELECTRICAL PTC THERMISTORS CONNECTED IN PARALLEL

(71) Applicant: Vorwerk & Co. Interholding GmbH, Wuppertal (DE)

(72) Inventors: Kevin Schmitz, Düsseldorf (DE); Sebastian Tietz, Leverkusen (DE)

(73) Assignee: Vorwerk & Co. Interholding GmbH

( * ) Notice: Subject to any disclaimer, the term of this patent is extended or adjusted under 35 U.S.C. 154(b) by 291 days.

(21) Appl. No.: 16/925,321

(22) Filed: Jul. 9, 2020

(65) Prior Publication Data

US 2021/0144814 A1    May 13, 2021

(51) Int. Cl.
*A47J 27/00* (2006.01)
*H05B 3/14* (2006.01)
*H05B 3/26* (2006.01)
*H05B 3/68* (2006.01)

(52) U.S. Cl.
CPC .............. *H05B 3/68* (2013.01); *A47J 27/004* (2013.01); *H05B 3/141* (2013.01); *H05B 3/26* (2013.01); *H05B 3/262* (2013.01); *H05B 2203/002* (2013.01); *H05B 2203/007* (2013.01); *H05B 2203/019* (2013.01); *H05B 2213/07* (2013.01)

(58) Field of Classification Search
None
See application file for complete search history.

(56) References Cited

U.S. PATENT DOCUMENTS

| | | | | |
|---|---|---|---|---|
| 6,150,636 A | * | 11/2000 | Bogdanski | A47J 27/002 219/443.1 |
| 2010/0193502 A1 | * | 8/2010 | Kim | H05B 3/748 219/520 |
| 2016/0121993 A1 | * | 5/2016 | Nehring | B32B 5/245 244/118.5 |
| 2018/0153341 A1 | * | 6/2018 | Roth | A47J 37/0676 |
| 2018/0187380 A1 | * | 7/2018 | Naylor | H05B 3/342 |
| 2022/0015197 A1 | * | 1/2022 | Schmitz | H05B 3/26 |

FOREIGN PATENT DOCUMENTS

| | | |
|---|---|---|
| DE | 102008038783 A1 | 2/2010 |
| EP | 0715483 A2 | 6/1996 |
| WO | 9102481 A1 | 3/1991 |
| WO | 9819499 A1 | 5/1998 |
| WO | WO9819499 A1 | 5/1998 |

OTHER PUBLICATIONS

First Office Action for Application No. 202010658493.3, dated May 11, 2022 (10 pages).

* cited by examiner

*Primary Examiner* — Joseph M. Pelham
(74) *Attorney, Agent, or Firm* — Barnes & Thornburg LLP

(57) ABSTRACT

The present disclosure relates to food preparation apparatus with an electrical heating device comprising at least two electrical PTC thermistors for heating a food in a food preparation room, wherein the electrical PTC thermistors are electrically connected in parallel. The parallel-connected PTC thermistors are electrically connected to one another by one or more electrical bridges.

24 Claims, 2 Drawing Sheets

Figure 1:
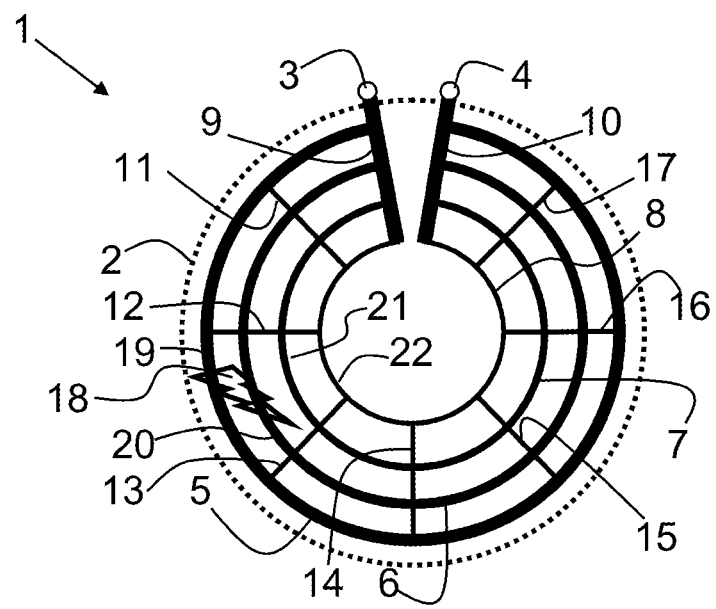

FOOD PREPARATION APPARATUS WITH ELECTRICAL PTC THERMISTORS CONNECTED IN PARALLEL

PRIORITY CLAIM

This application claims priority to European Patent Application No. 19185781.2, filed Jul. 11, 2019, which is hereby incorporated in its entirety herein.

FIELD OF THE DISCLOSURE

The present disclosure relates to a food preparation apparatus with an electrical heating device comprising at least two electrical PTC thermistors for heating a food in a food preparation room.

BACKGROUND

Food is regularly warmed or heated for its preparation. This is done, for example, by means of a stove having at least one hot plate in the form of a cooking plate. A cooking plate is a plate that can be heated by a heating device.

A cooking plate can be circular. It can also be a plate that can only be heated in certain areas. There can be one or more circular areas that can be heated. By heating the plate or an area of the plate, heat is transferred from the plate to a cooking vessel placed on it. Any food in the cooking vessel can be heated in this way.

A kitchen machine with a mixing vessel and a drive for an agitator in the mixing vessel is known from the publication DE 10 019 126 A1. At the bottom of the mixing vessel there is an electrical resistance heating element with conductor paths on a dielectric. By heating the bottom of the mixing vessel a food can be heated in the mixing vessel. The mixing vessel thus also serves as a cooking vessel.

The aim is to evenly heat the bottom of a cooking vessel in order to avoid local overheating of a food during its preparation. To achieve this, the base of a cooking vessel can include materials with good heat conductivity such as copper or aluminium, which serve as heat spreader layers. Heat supplied to the base should be evenly distributed by the well heat-conducting materials. An example of such a cooking vessel is known from the publication DE 20 2004 007 542 U1.

If the bottom of a cooking vessel is locally overheated, the heating device can be switched off until thermal equilibrium is reached. A cooking process is then delayed accordingly.

A cooking vessel provides a room for the preparation of a food. Such a room is therefore referred to as a food preparation room in the following.

An oven and microwave oven are further examples of food preparation equipment. An oven or a microwave oven comprises a room in which food is to be heated. Such a room is a food preparation room for purposes of the present disclosure. The aim of such food preparation rooms is also to supply heat evenly to the food in the preparation rooms.

SUMMARY

The aim of the present disclosure is to be able to prepare a food in a food preparation room quickly and reliably with little technical effort.

The aim of the present disclosure is achieved by a food preparation apparatus which is equipped with an electric heating device. The heating device comprises at least two electrical conductors for heating a food in a food preparation room. The electrical conductors are electrically connected in parallel. The electrical conductors are electrical PTC thermistors which are electrically connected to each other by one or more electrical bridges.

A PTC thermistor in the sense of the present disclosure has a positive temperature coefficient. This means that the electrical resistance of the PTC thermistor increases with increasing temperature.

An electrical voltage applied to the PTC thermistors is the same for each PTC thermistor due to the parallel connection. If the PTC thermistors have different electrical resistances, different electrical partial currents are produced. The electrical partial currents behave inversely to the respective resistances. A relatively small electrical current flows in a PTC thermistor with a high-resistance. A relatively high electric current flows in a PTC thermistor with a low ohmic resistance.

In addition to the parallel connection there are one or more electrical bridges. Each electrical bridge is an electrical conductor that electrically connects a PTC thermistor with at least one electrical PTC thermistor connected in parallel. This has the consequence that a partial current flowing through a PTC thermistor can change. This also happens depending on the temperature. Thus, overheated local areas can be avoided without having to provide a separate control system. Conversely, locally cool areas are inevitably heated up more. Good cooking results can therefore be achieved quickly and reliably.

The PTC thermistors, which are electrically connected in parallel, are arranged in a configuration in a plate. These PTC thermistors are then integrated into the plate. The PTC thermistors electrically connected in parallel can alternatively be mounted underneath a plate. The plate can be a floor or a wall of a food preparation room. Alternatively, the plate can be part of a cooking plate on which a vessel for preparing a food can be placed. This design ensures that the PTC thermistors are adjacent to the area where a food can be placed for preparation. Cooking results can be further improved.

Examples of the disclosure are explained in more detail below.

BRIEF DESCRIPTIONS OF THE DRAWINGS

Figure 2:
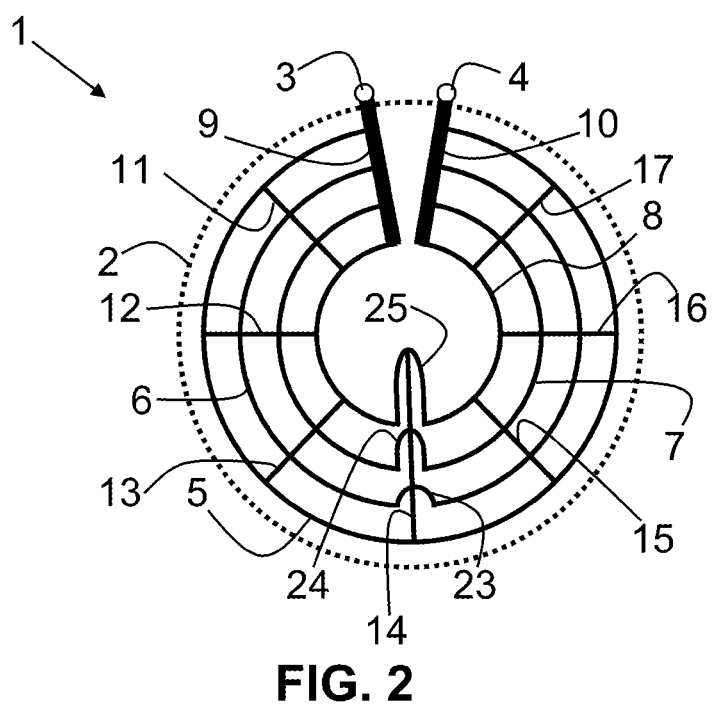
Figure 3:
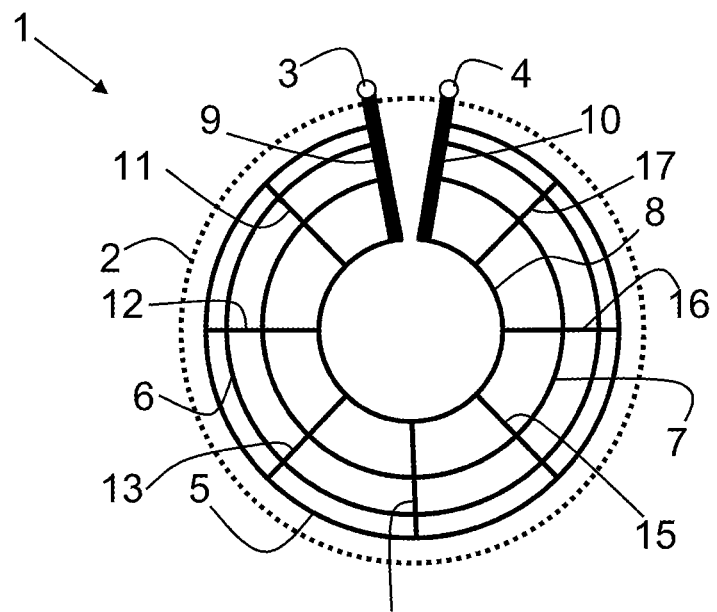
Figure 4:
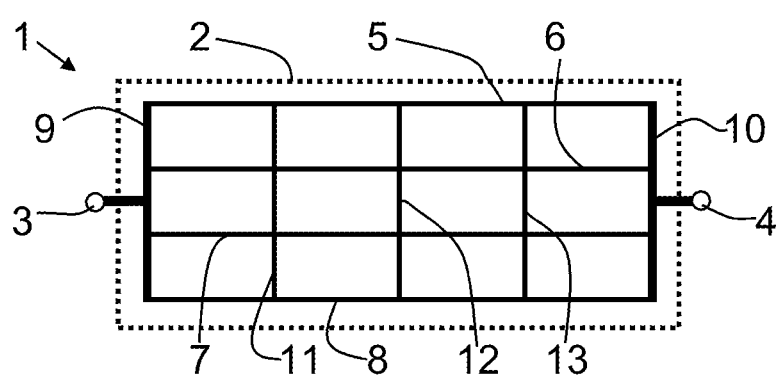

The figures show
FIG. 1: Heating plate of a first embodiment;
FIG. 2: Heating plate of a second embodiment;
FIG. 3: Heating plate of a third embodiment;
FIG. 4: Heating plate of a fourth embodiment.

DETAILED DESCRIPTION

FIG. 1 shows a heating plate 1 of a food preparation apparatus. The food preparation apparatus can be a stove or a kitchen machine. The heating plate may be a cooking plate or the bottom of a vessel or pot in which food can be prepared. The heating plate 1 comprises a plate 2, which may be circular as shown in FIG. 1. However, plate 2 can also be rectangular, for example. For example, plate 2 may be made entirely or mainly of ceramic, glass and/or metal. Heating plate 1 comprises an electrical heating device with two electrical connectors 3 and 4, one of which is connected or may be connected to the positive pole of a direct current source. The other electrical connector 4 can then be connected to the negative pole of the electrical direct current source. The electrical connectors 3, 4 are usually made of metal, for example completely or predominantly of copper, aluminium or steel. The electrical heating device comprises several PTC thermistors 5, 6, 7 and 8, for example electrical conductors made of metal with a positive temperature coefficient. The PTC thermistors 5, 6, 7, 8 can for example consist entirely or predominantly of copper, aluminium and/or iron. If an electric current flows through the PTC thermistors 5 to 8, the PTC thermistors 5 to 8 are heated by it. The heat generated in this way can be supplied to a food for a preparation.

FIG. 1 shows four electrical PTC thermistors 5 to 8. However, more than four electrical PTC thermistors or less than four electrical PTC thermistors can also be provided.

The PTC thermistors 5, 6, 7, 8 are electrically connected in parallel. The first ends of the PTC thermistors 5, 6, 7, 8 are therefore electrically connected to each other by a first electrical connection conductor 9, and the second ends of the PTC thermistors 5, 6, 7, 8 are electrically connected to each other by a second electrical connection conductor 10. The first electrical connection conductor 9 is electrically connected to one electrical connector 3. The second electrical connection conductor 10 is electrically connected to the other electrical connector 4.

The PTC thermistors 5 to 8 which are electrically connected in parallel are electrically connected to each other by electrical bridges 11 to 17. The electrical bridges 11 to 17 can also consist entirely or predominantly of a metal such as copper, aluminium or iron.

If the heating plate 1 is connected to a power source and an electric current flows through the PTC thermistors 5 to 8, this heats the heating plate 1. The electrical PTC thermistors 5 to 8 connected in parallel are therefore resistance heating conductors for heating a food. If there is an area 18 which heats up more than adjacent heated areas, the affected sections of the PTC thermistors are heated up more. In the case of FIG. 1 these are sections 19, 20 of the two external PTC thermistors 5 and 6, which are located between the electrical bridges 12 and 13. As a result of the temperature, the electrical resistance in these sections 19 and 20 increases more than the electrical resistance in the adjacent sections 21 and 22. This causes electrical current to flow from electrical connector 3, for example, via bridge 12 to sections 21 and 22. After passing through sections 21 and 22, electrical current will flow through bridge 13 back to the two PTC thermistors 5 and 6. Thus, the heating power is reduced in the area 18 which has heated up excessively. It is true that sections 21 and 22 will then produce more heat than planned. Overall, however, the heat generated by PTC thermistors 5 to 8 is distributed more favorably.

A locally more strongly heated area 18 can occur, for example, because heat can be transported away locally to a food to a reduced extent and therefore a heat accumulation occurs.

The PTC thermistors 5 to 8 which are electrically connected in parallel can be located inside plate 2, i.e. they can be integrated into plate 2. The PTC thermistors 5 to 8 connected electrically in parallel can be located on the underside of plate 2. If a food is prepared, it is then located above the top of plate 2.

The material of the bridges 11 to 17 can be advantageously selected in such a way that the temperature coefficient of the electrical bridges 11 to 17 is smaller than the temperature coefficient of the parallel-connected electrical PTC thermistors 5 to 8. The temperature coefficient of the electrical bridges 11 to 17 can also be zero or smaller than zero.

The electrical resistance of each electrical bridge 11 to 17 can advantageously be smaller than the electrical resistance of a section 19, 20, 21, 22 of an electrical PTC thermistor 5, 6, 7, 8, which is located between two adjacent electrical bridges 12, 13.

In the case of FIG. 1, the parallel-connected electrical PTC thermistors 5 to 8 run in a circle and parallel to each other in order to be able to heat the upper side of plate 2, which is provided for this purpose, as evenly as possible. The parallel-connected electrical PTC thermistors 5 to 7 therefore run along a circular path. The distances between the parallel-connected electrical PTC thermistors 5 to 8 are the same in the case of FIG. 1.

The cross-section of the electrical PTC thermistors 5 to 8 can decrease from the outside to the inside as shown in FIG. 1, in order to be able to generate heat in a favourably distributed manner. The cross-section of the external PTC thermistor 5 is therefore larger than the cross-section of the adjacent PTC thermistor 6. The cross-section of the PTC thermistor 6 is larger than the cross-section of the other adjacent PTC thermistor 7. The cross-section of the PTC thermistor 7 is larger than the cross-section of the other adjacent PTC thermistor 8.

In the case of FIG. 1, the electrical bridges 11 to 17 have equal distances between them. The distances between electrical connecting conductors 9, 10 on the one hand and the adjacent bridges 11, 17 on the other hand are the same as any distance between two adjacent bridges 11 to 17.

FIG. 2 shows a second embodiment of the present disclosure. This embodiment differs from the embodiment in FIG. 1 in that although the cross-sections of the electrical PTC thermistors 5 to 8 are the same size, the PTC thermistors 5 to 8 are the same or at least similar in length. This is achieved by loops 23 to 25 of different lengths, i.e. by a deviation from the otherwise circular shape of the PTC thermistors 5 to 8. The outer PTC thermistor 5 does not have a loop. The adjacent PTC thermistor 6 has a comparatively short loop 23. The next PTC thermistor 7 has a loop 24 of medium length. The inner PTC thermistor 8 has a loop 25 with the greatest length. Since the PTC thermistors 5 to 8, which run predominantly in a circle, have the same length or at least a similar length due to the loops 23 to 25 and are also otherwise identical, the electrical resistances of the PTC thermistors 5 to 8 are the same or at least similar. Each PTC thermistor thus generates the same heat output per unit length or at least a similar heat output at the same temperature. This contributes to the ability to heat a desired surface evenly in order to achieve good cooking results.

The loops 23 to 25 do not have to be in the same plane as the other sections of the PTC thermistors 5 to 8. These can therefore protrude from the underside of plate 2, for example, in order not to locally overheat food located above it in the area of loops 23 to 25 during a preparation.

FIG. 3 shows a third embodiment of the present disclosure. This embodiment differs from the embodiment in FIG. 1 in that the cross-sections of the otherwise identical electrical PTC thermistors 5 to 8 are of the same size. However, the distance between the PTC thermistors 5 to 8 increases from the outside to the inside. Thus, the distance between the two outer PTC thermistors 5 and 6 is small. The distance between the two inner PTC thermistors 7 and 8 is large. The distance between the two PTC thermistors 6 and 7 has a medium value compared with the other two distances. It is true that the heating capacity of a PTC thermistor 5 to 8 in relation to a unit of length is lower the longer the respective PTC thermistor 5 to 8 is. This is because the electrical resistance increases with the increasing length of a PTC thermistor 5 to 8. However, as the distance between the PTC thermistors decreases from inside to outside, the desired surface can still be heated evenly to achieve a good cooking result.

It is also possible to combine the different measures shown in FIGS. 1 to 3 in order to heat a surface evenly. FIGS. 1 to 3 show the case where PTC thermistors 5 to 8 are almost completely circular. However, these can also be only approximately semicircular and be combined with other PTC thermistors running in approximately semicircular form together with bridges and electrical connections, so that a circular surface can be heated evenly or at least essentially evenly.

FIG. 4 shows the case of a rectangular plate 2, which can be heated by PTC thermistors 5 to 8. Each PTC thermistor 5 to 8 is of the same nature and runs in a straight line parallel to one edge of the plate 2. The PTC thermistors 5 to 8 have the same spacing between them. There are three bridges 11, 12 and 13 which electrically connect the PTC thermistors 5 to 8 with each other. The bridges 11, 12 and 13 have equal distances between them. The distances between an electrical connection conductor 9, 10 and the adjacent bridges 11 and 13 are also the same as shown in FIG. 4.

Such a plate 2 could, for example, be a side wall of a baking oven, through which the interior of the baking oven can be heated.

In an embodiment of the present disclosure, the temperature coefficient of an electrical bridge is advantageously smaller than the temperature coefficient of the parallel connected electrical PTC thermistors. The temperature coefficient of an electrical bridge can be less than or equal to zero. If a temperature coefficient is less than zero, the electrical resistance decreases with increasing temperature. If a temperature coefficient is equal to zero, the electrical resistance does not change depending on the temperature. It is therefore better achieved that partial currents are distributed favourably to the electrical PTC thermistors in order to avoid temperature imbalances in a food during its preparation. Cooking results can be improved quickly and reliably.

The electrical resistance of an electrical bridge is advantageously smaller than the electrical resistance of a section of an electrical PTC thermistor between the electrical bridge and an adjacent electrical bridge. This applies if the temperature is the same. It is therefore better achieved that partial currents are distributed favourably to the electrical PTC thermistors in order to obtain good cooking results quickly and reliably.

In an embodiment, the electric heating device comprises at least three or four electric PTC thermistors connected in parallel. However, there may also be more than four electric PTC thermistors connected in parallel, for example at least ten or at least twenty electric PTC thermistors connected in parallel. Each electrical PTC thermistor is then electrically connected to at least one other electrical PTC thermistor also via an electrical bridge. Preferably, each electrical bridge connects all parallel-connected electrical PTC thermistors.

The electrical PTC thermistors connected in parallel are preferably resistance heating conductors for heating a food. The PTC thermistors therefore generate enough heat which can and should be used to heat a food. However, sections of each electrical PTC thermistor can also, for example, alternatively or additionally include another electrical heating element in order to generate heat alternatively or additionally by the other electrical heating element. The other electrical heating element is then supplied with electrical current via the PTC thermistor. Such a section is bounded by at least one bridge which connects this electrical PTC thermistor with another electrical PTC thermistor connected in parallel.

The parallel-connected electrical PTC thermistors run completely or predominantly spatially parallel to each other. This further improves the ability to achieve a good cooking result quickly and reliably.

The electrical resistances of the electrical PTC thermistors connected in parallel are the same at the same temperature, for example at room temperature. This makes it possible to achieve that each electrical PTC thermistor can generate the same heat output per unit length. This is particularly true if the PTC thermistors are otherwise identical, i.e. consist of the same material and have the same cross sections. This further improves the ability to achieve a good cooking result quickly and reliably.

The electrical PTC thermistors connected in parallel can be of the same length to further improve the ability to achieve a good cooking result quickly and reliably.

There may be several electrical bridges with equal distances between the bridges. In this way a cooking result can be further improved.

The electrical PTC thermistors connected in parallel can mainly run along a circular path. This design is advantageous for solving the object of the present disclosure if a circular bottom of a food preparation vessel is to be heated.

Parallel-connected electrical PTC thermistors can comprise loops of different lengths. In addition, parallel-connected electrical PTC thermistors can, for example, run spatially parallel to each other in a different shape. This can be done in such a way that generated heat can be distributed as evenly as possible. This can further improve a cooking result.

Distances between adjacent electrical PTC thermistors connected in parallel can be equal. It is particularly advantageous in this case, for example by using loops, to ensure that each PTC thermistor can generate the same heat per unit of length, so that heat can be generated in a suitably distributed manner. A cooking result can thus be further improved. In the area of the loops the PTC thermistors can then have different distances to each other.

Distances between adjacent electrical PTC thermistors connected in parallel, which are at least predominantly circular, can decrease from inside to outside. This can happen in such a way that heat can be generated as evenly distributed as possible. A cooking result can thus be further improved.

Cross-sections of the PTC thermistors can differ in order to control the size of the electrical partial currents flowing through the PTC thermistors. This can be used to generate evenly distributed heat. Thus, the cross-section of PTC thermistors can increase from the inside to the outside if PTC thermistors run along a circular path. A cooking result can thus be further improved.

The food preparation apparatus can be a kitchen machine that includes a pot for preparing food in the pot. The kitchen machine may include a mixing tool for mixing a food and/or a scale for determining a weight of a food.

However, the food preparation apparatus may also be a stove, a baking oven or a microwave oven.

The bottom of a cooking vessel may include the PTC thermistors which are electrically connected in parallel. A kitchen machine may include the cooking vessel. The cooking vessel may also be the container in which ingredients for food can be mixed and/or chopped and/or weighed.

The principle according to the present disclosure can also be applied to inductive heating elements or microwave generators. Thus, a plurality of coils can be provided to heat a vessel or the food directly with microwaves inductively.

Designs in accordance with the disclosed embodiments make it possible to avoid burning of food by automatic redistribution of electric current. Such designs selectively generates heat at cold spots, thereby inherently avoiding hot spots.

Designs in accordance with the disclosed embodiments may, for example, enable even temperature distribution on a heating plate. In this way, the burning of food can be avoided and the heating time can be reduced by a more even heat input into the food, i.e. into the food. This is possible without additional electrical connections, regulation or switches and is completely self-regulating. No additional components are required for this, which keeps the installation space and manufacturing costs low.

According to designs with features as described in this disclosure, the redistribution takes place before the conversion of electrical energy into thermal energy. This can considerably improve the dynamic response behaviour. There is no additional technical effort for materials with particularly good thermal conductivity. The use of palladium can be reduced in comparison to other solutions, because the reduction of the alloy component palladium in the heating conductor even favours the electrical redistribution for the proposed system. If the electrical PTC thermistors connected in parallel are integrated in a pot of a kitchen machine, the ergonomics of the pot are not negatively affected by excessive weight.

Designs in accordance with the present disclosure use the PTC effect of a current-carrying heating conductor, i.e. the increasing electrical resistance with increasing temperature, in order to redistribute electric current in a suitable manner. The electrical PTC thermistors connected in parallel can be divided into concentric rings in the form of conductor tracks and can then be used to heat a heating plate evenly.

If there are no heat blockages (e.g. due to burnt-on food) on the heating plate, the electric current is divided according to the resistances of the concentric conductor paths, i.e. the electric PTC thermistors. For this purpose, the electrical PTC thermistors can be geometrically designed (cross-section and length) so that a defined heat flux density (power per area) is set over the radius of the heating plate (e.g. constant heat flux density). Heat can be generated by the PTC thermistors, when an electric current flows through the PTC thermistors. This can lead to an increase in the temperature of a heating plate.

If there are one or more heat blockages on the heating plate, which result in local temperature peaks, the resistance in the corresponding section of an electrical PTC thermistor in the corresponding area of the heating plate increases. Due to the PTC effect, this leads to an increase in the electrical resistance, which automatically diverts the current to colder areas. For this purpose, the concentric conductor paths, i.e. the electrical PTC thermistors, are connected to each other at several points around the circumference by electrically well conducting bridges. The current, which takes the path of least resistance, is diverted via these bridges and distributed to other, non-blocked conductor paths, i.e. electrical PTC thermistors. There the electrical resistance is lower due to the lower temperature. The redistributed current generates a warming at the colder areas next to the heat blockage. In contrast, the hotter areas can cool down. This results in a temperature equalization.

In addition to the number, arrangement, geometry and material of the conductors, i.e. the electrical PTC thermistors, and their distance from each other, the same parameters of the bridges can be varied with the aim of achieving an even temperature distribution at all operating points in order to achieve good cooking results quickly and reliably.

Designs in accordance with this disclosure can create a self-regulating system that generates heat primarily at cold spots. Only two electrical contacts are required to operate the self-regulating system. The self-regulating system can be produced in a thick-film process. The primary effect is not that heat must first be diverted, but that the position of the heat generation is adjusted. Active control is not required. No switching elements or actuators are involved in the regulation. A simple implementation is possible without the use of additional material, for example copper. Compared to systems with a high heat capacity, the dynamics are higher. Unfavourable materials such as palladium, which are used to avoid a PTC effect, can be dispensed with, at least with regard to the PTC thermistors. Especially these PTC thermistors preferably do not contain palladium.

The invention claimed is:

1. A food preparation apparatus with an electrical heating device, the apparatus comprising
   at least two electrical PTC thermistors configured to heat a food in a food preparation chamber, the at least two electrical PTC thermistors being electrically connected in parallel,
   wherein the at least two PTC thermistors are electrically connected to one another by one or more electrical bridges;
   wherein the at least two PTC thermistors extend at least predominantly along a circular path.

2. The apparatus of claim 1, wherein the at least two PTC thermistors are arranged in a plate or on the underside of a plate.

3. The apparatus of claim 1, wherein the temperature coefficient of an electrical bridge is smaller than the temperature coefficient of at least two PTC thermistors or that the temperature coefficient of an electrical bridge is smaller than or equal to 0.

4. The apparatus of claim 1, wherein the electrical resistance of an electrical bridge is smaller than the electrical resistance of a section of an electrical PTC thermistor between the electrical bridge and an adjacent electrical bridge.

5. The apparatus of claim 1, wherein the electrical heating device comprises at least three or four electrical PTC thermistors connected in parallel.

6. The apparatus of claim 1, wherein the at least two PTC thermistors are resistance heating conductors configured to heat a food.

7. The apparatus of claim 1, wherein the at least two PTC thermistors run parallel to one another.

8. The apparatus of claim 1, wherein the electrical resistances of the at least two PTC thermistors are equal at the same temperature.

9. The apparatus of claim 1, wherein a plurality of electrical bridges are present, which have equal distances between them.

10. The apparatus of claim 1, wherein PTC thermistors are present which comprise loops of different lengths.

11. The apparatus of claim 1, wherein the food preparation apparatus includes at least three PTC thermistors and the at least three PTC thermistors are arranged so as to provide distances between the at least three PTC thermistors, which extend at least predominantly in a circle, that decrease from the inside to the outside.

12. The apparatus of claim 2, wherein the temperature coefficient of an electrical bridge is smaller than the temperature coefficient of the at least two PTC thermistors or that the temperature coefficient of an electrical bridge is smaller than or equal to 0.

13. The apparatus of claim 12, wherein the electrical resistance of an electrical bridge is smaller than the electrical resistance of a section of an electrical PTC thermistor between the electrical bridge and an adjacent electrical bridge.

14. The apparatus of claim 6, wherein a plurality of electrical bridges are present, which have equal distances between them.

15. The apparatus of claim 1, wherein the at least two electrical PTC thermistors are longer than the one or more electrical bridges.

16. The apparatus of claim 15, wherein PTC thermistors are present which comprise loops of different lengths.

17. The apparatus of claim 15, wherein there are at least three PTC thermistors and the at least three PTC thermistors are arranged so as to provide (i) distances between the at least three PTC thermistors that are equal or (ii) distances between the at least three PTC thermistors, which extend at least predominantly in a circle, that decrease from the inside to the outside.

18. The apparatus of claim 17, wherein the at least two PTC thermistors extend at least predominantly along a circular path.

19. The apparatus of claim 17, wherein there are at least three PTC thermistors and the at least three PTC thermistors are arranged so as to provide (i) distances between the at least three PTC thermistors that are equal or (ii) distances between the at least three PTC thermistors, which extend at least predominantly in a circle, that decrease from the inside to the outside.

20. The apparatus of claim 19, wherein the at least two PTC thermistors extend at least predominantly along a circular path.

21. The apparatus of claim 19, wherein PTC thermistors are present which comprise loops of different lengths.

22. A food preparation apparatus with an electrical heating device, the apparatus comprising:
    at least two electrical PTC thermistors configured to heat a food in a food preparation room, the at least two electrical PTC thermistors being electrically connected in parallel,
    wherein the at least two PTC thermistors are electrically connected to one another by one or more electrical bridges, and
    wherein the at least two PTC thermistors run parallel to one another.

23. A food preparation apparatus with an electrical heating device, the apparatus comprising:
    at least two electrical PTC thermistors configured to heat a food in a food preparation room, the at least two electrical PTC thermistors being electrically connected in parallel,
    wherein the at least two PTC thermistors are electrically connected to one another by one or more electrical bridges, and
    wherein PTC thermistors are present which comprise loops of different lengths.

24. A food preparation apparatus with an electrical heating device, the apparatus comprising:
    at least three electrical PTC thermistors configured to heat a food in a food preparation room, the at least three electrical PTC thermistors being electrically connected in parallel,
    wherein the at least three PTC thermistors are electrically connected to one another by one or more electrical bridges, and
    wherein the at least three PTC thermistors are arranged so as to provide (i) distances between the at least three PTC thermistors that are equal or (ii) distances between the at least three PTC thermistors, which extend at least predominantly in a circle, that decrease from the inside to the outside.

* * * * *

UNITED STATES PATENT AND TRADEMARK OFFICE
CERTIFICATE OF CORRECTION

PATENT NO. : 11,638,330 B2
APPLICATION NO. : 16/925321
DATED : April 25, 2023
INVENTOR(S) : Kevin Schmitz and Sebastian Tietz Page 1 of 1

It is certified that error appears in the above-identified patent and that said Letters Patent is hereby corrected as shown below:

On the Title Page

Column 1, item (30) Foreign Application Priority Data should be added, and under it should include:
--Jul. 11, 2019 (EP) ........................................ 19185781--

Signed and Sealed this
Tenth Day of September, 2024

Katherine Kelly Vidal
*Director of the United States Patent and Trademark Office*